United States Patent [19]

Feder et al.

[11] 3,980,501

[45] Sept. 14, 1976

[54] USE OF HYDROGEN-ABSORBING ELECTRODE IN ALKALINE BATTERY

[75] Inventors: David Oscar Feder, Madison; Dean William Maurer, Berkeley Heights, both of N.J.

[73] Assignee: Bell Telephone Laboratories, Incorporated, Murray Hill, N.J.

[22] Filed: June 19, 1974

[21] Appl. No.: 480,703

[52] U.S. Cl. .................................. 429/60; 429/218; 428/223

[51] Int. Cl.[2] .................. H01M 10/34; H01M 10/52

[58] Field of Search .................. 136/86 A, 86 R, 28, 136/179, 6 GC

[56] References Cited

UNITED STATES PATENTS 3,108,908 10/1963 Krebs .................................. 136/26

3,769,088 10/1973 Seiger et al. ........................ 136/179

3,850,694 11/1974 Dunlop et al. .................... 136/86 A

*Primary Examiner*—John H. Mack

*Assistant Examiner*—H. A. Feeley

*Attorney, Agent, or Firm*—W. G. Nilsen

[57] ABSTRACT

Alkaline batteries are described in which a special electrode is incorporated in the positive electrode in order to give added protection against electrochemical damage due to battery reversal. This special electrode contains a hydrogen-absorbing material which also acts as a hydrogen electrode for the conversion of hydrogen ions into elemental hydrogen. Such alkaline batteries are particularly well protected against hydrogen overpressure due to battery reversal with only a small penalty in energy density. Particularly suitable for this application is the use of a hydrogen-absorbing material with nominal formula $LnM_5$ in which Ln represents a lanthanide metal and M is either cobalt or nickel.

4 Claims, 3 Drawing Figures

USE OF HYDROGEN-ABSORBING ELECTRODE IN ALKALINE BATTERY

BACKGROUND OF THE INVENTION

1. Field of the Invention

The invention relates to alkaline batteries and more particularly to the structure of the positive electrode of alkaline batteries.

2. Description of the Prior Art

Sealed alkaline batteries are of considerable importance as a source of energy. Their long shelf life, high efficiency, and reasonable charge and discharge rates make them highly desirable for many applications. Since the cell is sealed, little or no maintenance is required which for many applications is highly desirable. For example, sealed alkaline batteries are often used as a source of power in remote outdoor locations. Among alkaline batteries the nickel-cadmium battery is particularly noteworthy because of its exceptionally good performance. One of the particular problems associated with the use of alkaline cells connected in series is the accidental reversal of one or more of the alkaline cells. Reversal refers to the condition in which one or more cells becomes completely discharged while current generated from other cells connected in series is pumped through the discharged cell. This leads to the generation of hydrogen gas at the discharged positive electrode. Continued reversal of the cell may lead to extremely high pressures of hydrogen or oxygen which eventually results in the bursting or venting of the battery. This essentially destroys the battery and interrupts operation of the entire power package.

Both chemical and electronic procedures have been used to prevent the generation of hydrogen gas on battery reversal. In the chemical procedure a cadmium hydroxide is included in the positive electrode. On battery reversal the cadmium electrode is charged thus preventing an evolution of hydrogen gas. This procedure sometimes limits the life of the cell due to dendritic growth of cadmium which may electrically short out electrodes in the cell. Also this procedure reduces the capacity of the positive electrode.

Other procedures involve the use of various electronic circuits which sense the complete discharge of the cell and then by-pass that particular cell. Although these procedures are reasonably reliable, they all require voltages which reduce the voltage output of the cell.

SUMMARY OF THE INVENTION

The invention is an alkaline battery in which a hydrogen-absorbing electrode is electrically connected to the positive electrode to prevent hydrogen overpressure on reversal of the positive electrode. The hydrogen-absorbing electrode should be capable of absorbing hydrogen gas and converting hydrogen gas into hydrogen ions. Typical hydrogen-absorbing materials are FeTi, NiTi, $NiTi_2$, etc. The compounds represented by the nominal formula $LnM_5$ give particularly good performance in this application because of their large hydrogen-absorbing capacities (see for example *Electrochemical Device Using Hydrogen Absorber*, by A. D. Butherus et al. Case 7-2-7, filed even date, Ser. No. 480,678 now abandoned). In this nominal formula, Ln represents a lanthanide metal and M is either cobalt or nickel. The compounds $LaCo_5$, $LaNi_5$ and $SmCo_5$ are typical examples. The compounds $LaNi_5$ and $SmCo_5$ are preferred because of low cost, high capacity to absorb hydrogen gas and the low pressure at which absorption takes place. In addition to individual lanthanide metals, a mixture of lanthanide metals such as mischmetal may also be used. Mischmetal is advantageous because of low costs. Typical alkaline batteries are the nickel-cadmium battery, the silver-cadmium battery, the nickel-zinc battery, the silver-zinc battery, the mercury-zinc battery, the manganese-zinc battery, etc. Alkaline batteries incorporating a hydrogen-absorbing electrode in the positive electrode show excellent protection against the effects of hydrogen overpressure due to electrode reversal.

DETAILED DESCRIPTION

1. Operation of Alkaline Cells Incorporating Hydrogen-Absorbing Electrode

Figure 1:
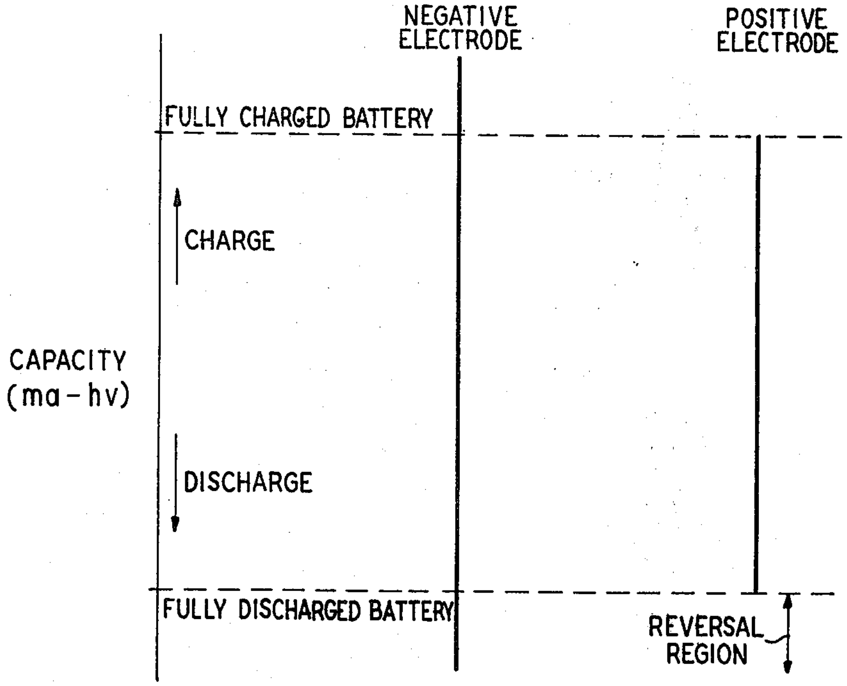
FIG. 1 shows on a coordinate of electrode capacity in units of milliampere-hours the relative capacity of the negative and positive electrodes of an alkaline battery.

An understanding of the invention is facilitated by a description of the operation of typical sealed secondary alkaline batteries and the effect of connecting a hydrogen-absorbing material to the positive electrode. FIG. 1 shows a representation of the relative capacity of positive and negative electrodes of a typical alkaline cell. Also shown is the electrochemical balance between the two electrodes; that is, the position on the charge capacity of one electrode where the other electrode is fully charged and is fully discharged. In typical sealed alkaline cells, the relative capacity and electrochemical balance between electrodes is made such as to prevent fully charging or fully discharging the negative electrode. Overcharging the negative electrode is undesirable because hydrogen gas is produced which results in overpressure of hydrogen gas in the sealed cell. Complete discharge of the negative electrode is undesirable because of the difficulty in recharging a completely discharged negative electrode.

Battery reversal occurs after the positive electrode is completely discharged. Current from cells connected in series which are not completely discharged is forced through the positive electrode. This results in hydrogen gas evolution. On continued battery reversal, pressure from the hydrogen gas may burst or vent the cell. Even moderate amounts of battery reversal are detrimental in that the negative electrode continues to be discharged during battery reversal which alters the electrochemical balance between positive and negative electrodes and leads to capacity fading when excess negative capacity is discharged.

The invention is a sealed secondary alkaline battery which employs a hydrogen-absorbing electrode connected electrically either internally or externally to the positive electrode. The hydrogen-absorbing electrode is capable not only of absorbing hydrogen gas, thereby limiting the pressure of hydrogen gas but also of converting hydrogen (usually in the form of a hydride of the hydrogen-absorbing material) to hydrogen ions. On battery reversal, the generated hydrogen gas is absorbed by the hydrogen-absorbing electrode. This limits the pressure in the cell and prevents bursting or venting of the cell.

Use of a hydrogen-absorbing electrode also prevents alteration of the electrochemical balance between the negative and positive electrode. On battery reversal, the hydrogen-absorbing electrode is being charged in the sense that hydrogen ions plus hydrogen-absorbing material plus electrons are converted to the hydride of the hydrogen-absorbing material. On recharging the battery, the hydrogen-absorbing electrode is discharged and the positive electrode begins charging at the same point on the negative-electrode charge curve.

This charging and discharging of the hydrogen-absorbing electrode may be illustrated by chemical equation as follows. For clarity, the material $SmCo_5$ is used as an example.

$$6H_2O + SmCo_5 + 6e \underset{\text{discharge}}{\overset{\text{charge}}{\rightleftarrows}} SmCo_5H_6 + 6OH^-$$

Here the chemical equation going to the right illustrates the chemical reaction in the hydrogen-absorbing electrode when the positive electrode is discharged in the reversal region. In this region, the hydrogen-absorbing electrode is being charged in the sense of its use as a negative electrode. The chemical equation to the left illustrates the chemical reaction on recharging the positive electrode. This is equivalent to discharging a hydrogen negative electrode.

It is preferred in most practical applications that the hydrogen-absorbing electrode have between 5 percent and 30 percent of the capacity of the positive electrode. Below 5 percent, adequate protection is not provided; above 30 percent, protection is already adequate and the reduction in the capacity of the positive electrode becomes excessive. Typically, for $LaNi_5$, 5 to 30 percent of a nickel electrode capacity would represent 1.5 to 10 percent of its volume and therefore results in a rather small penalty in energy density.

2. Composition of Hydrogen-Absorbing Material

A variety of materials may be used in making up the hydrogen-absorbing electrode. The essential requirements are that the material absorb hydrogen and that it acts as an electrode in the conversion of hydrogen to hydrogen ions. Typical hydrogen-absorbing materials are FeTi, NiTi, $NiTi_2$, etc.

Particularly suitable for this application is a class of compounds with nominal formula $LnM_5$ in which Ln represents any one or a mixture of lanthanide metals including lanthanum and lutecium (atomic No. 57 to 71) and M represents either nickel or cobalt or a mixture of both. The compounds $LaCo_5$, $LaNi_5$ and $SmCo_5$ are preferred because of low cost, high capacity to absorb hydrogen, and low pressure at which the absorption takes place. Mixtures of lanthanide metals such as Mischmetal are preferred because of low cost.

Although the hydrogen-absorbing components are referred to by the formula $LnM_5$ believed to be an intermetallic compound, it is recognized that solid solutions with composition range from $LnM_{4.5}$ to $LnM_{5.5}$ are satisfactory although perhaps with decreased hydrogen-absorbing capacity for some compositions.

Preparation of the intermetallic compound can be carried out in a variety of ways. The most direct is fusing or melting the elements in proper proportion in an inert atmosphere such as an argon or helium atmosphere. Arc melting is particularly suitable in the preparation of these compounds.

The hydrogen-absorbing material may be put in the form suitable for use as an electrode material in a variety of ways. High charge and discharge rates are obtained if the electrode has a large surface area. Large surface areas are obtained in a variety of ways including sintering a powder of the hydrogen-absorbing material and by use of the powder in an organic binder.

Figure 2:
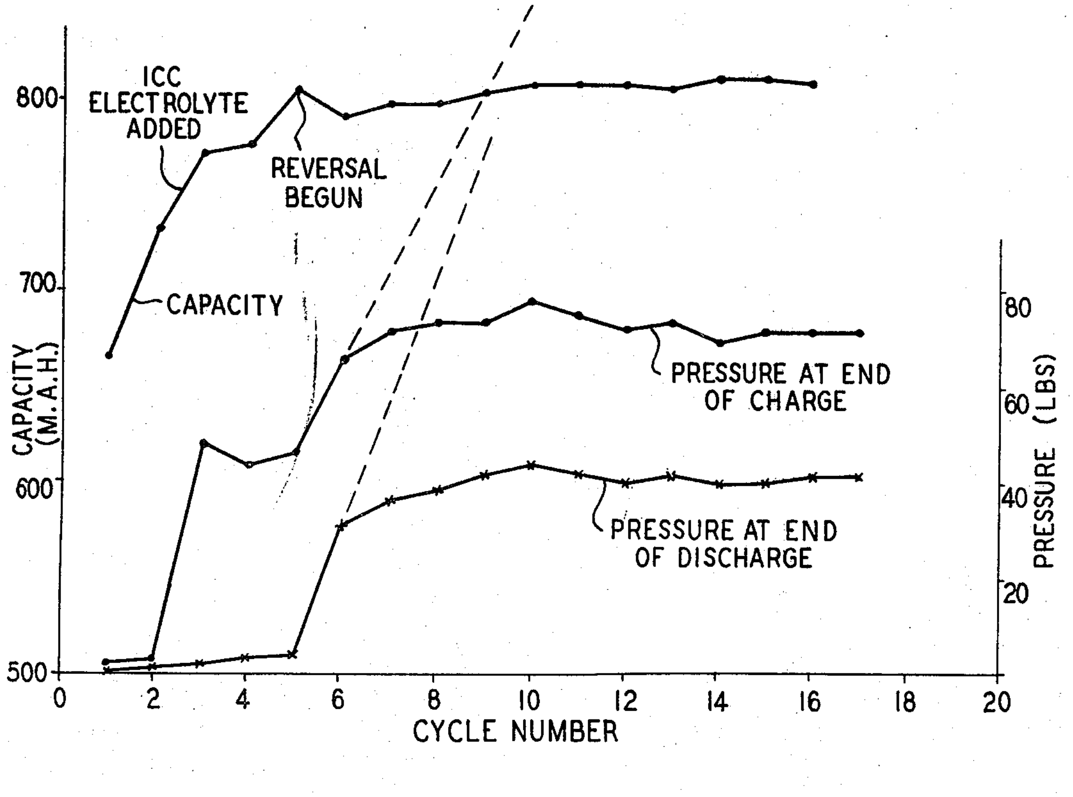
FIG. 2 shows for a sealed nickel-cadmium cell several plots as a function of cycle number of (1) the capacity of the cell (2) the pressure at the end of charge and (3) the pressure at the end of discharge.

3. Experimental Results Utilizing a Ni-Cd Cell with Hydrogen-Absorbing Electrode Experiments were carried out on a nickel-cadmium cell which incorporated a hydrogen-absorbing electrode in the positive electrode. The hydrogen-absorbing material used was $LaNi_5$ which was present in sufficient quantity to represent approximately 20% of the capacity of the positive electrode. The data obtained in these experiments are shown in FIG. 2. This figure shows the capacity of the cell in units of milliamperehours as a function of cycle number as well as the pressure inside of sealed cell at end of charge and discharge as a function of cycle number. For the first five cycles normal charge and discharge was used to stabilize the capacity of the battery, to adjust the amount of electrolyte, and to show normal performance of the battery. The increase in pressure at end of the charge part of the cycle is due to the liberation of oxygen at the positive electrode during charging. Oxygen pressure is stabilized at a low pressure because of recombination at the negative electrode during charging. Beginning with the fifth cycle the battery was reversed on discharge to approximately 10% of the capacity of the positive electrode. In ordinary cells which do not have hydrogen-absorbing material in the positive electrode, the pressure would increase approximately as shown by the dotted line in FIG. 2 until the cell burst or vented. However, because of the hydrogen-absorbing material in the positive electrode the pressure at the end of discharge is limited to approximately 40 pounds per square inch. Also it should be noted that the capacity of the cell remains unaffected even after repeated reversals of the positive electrode. These data demonstrate not only the fact that hydrogen-absorbing material incorporated in the positive electrode effectively protects the cell against overpressure but also protects the cell against any adverse effects on cell capacity due to repeated reversals of the positive electrode.

4. Typical Cell Using the Hydrogen-Absorbing Electrode

Figure 3:
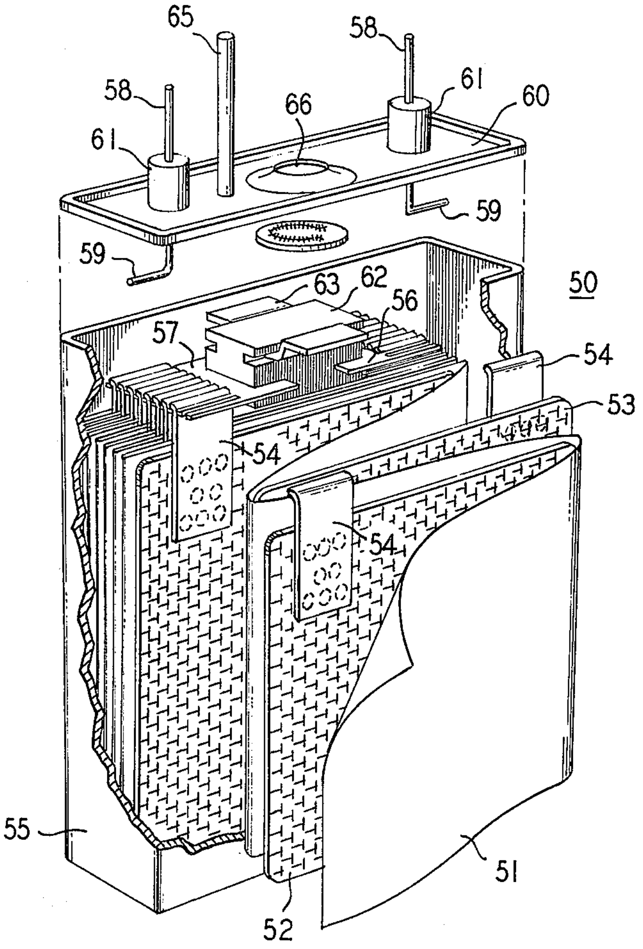
FIG. 3 shows a perspective view partly in section of a nickel-cadmium battery employing multiple positive and negative electrodes in which the positive electrode incorporates some hydrogen-absorbing material made in accordance with the invention.

FIG. 3 shows a cutaway view of a nickel-cadmium cell 10 made in accordance with the invention. The cell is made up of a separator 11 typically made of polypropylene or nylon, a negative electrode 12 and positive electrode 13, together with metal tabs 14 and outer can 15. The hydrogen-absorbing electrode is incorporated in the positive electrode by replacing some of the nickel plaques (impregnated with nickel hydroxide in this case) with hydrogen-absorbing material (fused $LaCo_5$) in this case. The metal tabs are connected together by a comb structure for negative 16 and positive 17 electrodes. Electrical connection is made to battery posts 18 by means of a metal strip 19. The metal posts are attached to the cover plate 20 by means of a compression seal 21. An insulating support 22 holds the comb structure in place. A metal tab 23 connected to the insulating structure attaches to the battery cover 20 on assembly. Also shown is the fill tube 25 and the battery vent 26.

What is claimed is:

1. A sealed alkaline battery package comprising at least two cells connected in series, said cells comprising a negative cadmium electrode, a positive nickel electrode and electrolyte characterized in that a material with nominal formula $LnM_5$ is electrically connected to the positive electrode so that on battery reversal said $LnM_5$ material is converted into a hydride with nominal formula $LnM_5H_6$ so as to maintain electrochemical balance between the positive electrode and the negative electrode and to prevent evolution of hydrogen from the positive electrode where Ln is lanthanide metal and M is a metal selected from the group consisting of nickel and cobalt and mixtures.

2. The battery of claim 1 in which $LnM_5$ is selected from the group consisting of $LaNi_5$, $LaCo_5$ and $SmCo_5$.

3. The device of claim 1 in which Ln is a mixture of lanthanide metals.

4. The battery of claim 1 in which the hydrogen-absorbing material in the positive electrode has an electro-chemical capacity of between 5 and 30% of the capacity of the positive electrode.

* * * * *